UNITED STATES PATENT OFFICE.

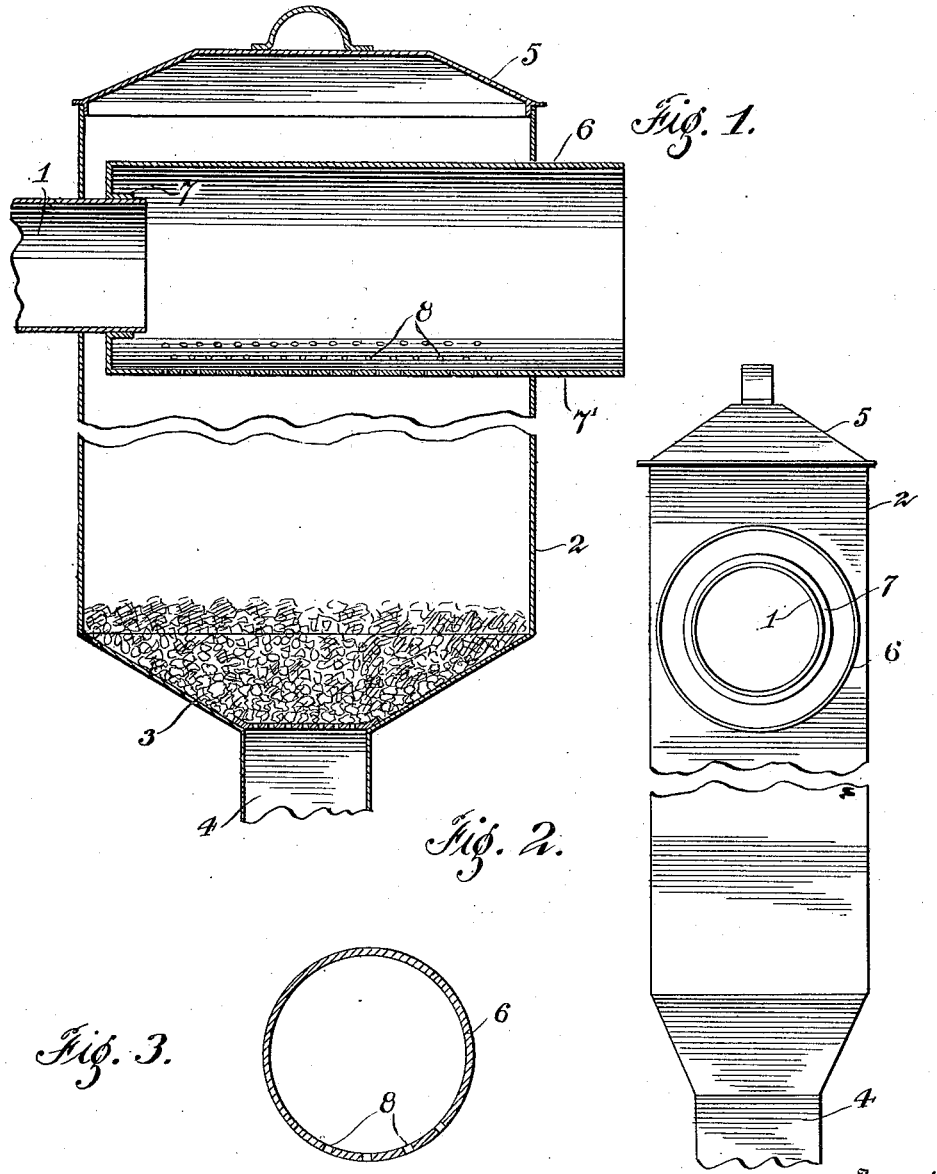

WILLIAM F. SMITH, OF SPRINGFIELD, OHIO.

COMBINED LIQUID CONVEYER AND FILTER.

1,192,948.  Specification of Letters Patent.  Patented Aug. 1, 1916.

Application filed November 17, 1915. Serial No. 62,030.

*To all whom it may concern:*

Be it known that I, WILLIAM F. SMITH, a citizen of the United States of America, residing at Springfield, in the county of Clark and State of Ohio, have invented new and useful Improvements in Combined Liquid Conveyers and Filters, of which the following is a specification.

This invention relates to a combined liquid conveyer and filter and has for its primary object to construct a device of this character including simple means for allowing the water conveyed, to be filtered or passed to a point away from the filtering apparatus, that is to say, when sufficient water has been filtered the remainder can be conveyed to a point exteriorly of the filter.

An object of the invention is to provide a conveyer of simple construction a portion of which may be rotated, which rotatable action causes the water to either pass through the filter or to a point exteriorly of the filter.

With these and other objects in view the invention consists in the construction, combination and arrangement of parts as will be hereinafter more fully described, illustrated in the accompanying drawing and pointed out in the claims hereunto appended.

Similar reference characters indicate corresponding parts throughout the several views.

In the drawing:—Figure 1 is a vertical section through a portion of my invention. Fig. 2 is an end elevation thereof. Fig. 3 is a detail view of the rotatably mounted tube.

In the drawing the numeral 1 designates a pipe having one end arranged to communicate with a source of liquid supply while the other end is arranged interiorly of a tank 2. This tank 2 has arranged in the bottom portion thereof filtering material 3, arranged directly over an outlet opening 4 that may convey the filtered liquid to a reservoir or other suitable receptacle. The top portion of the tank 2 is closed by a cover 5 by means of which access may be had to the tube 6 that has one end encircling and rotatably mounted upon the interiorly arranged end of the pipe 1 and for the purpose of allowing rotation of the tube 6 I provide the same with an inwardly extending annular flange 7 that engages directly the outer peripheral surface of the pipe 1. The opposite end of the tube 6 is arranged exteriorly of the tank as indicated at 7 so that any liquid leaving this end of the tube 6 will gravitate to a point remote from the filter. The tube 6 has approximately one-quarter of its peripheral surface perforated as indicated at 8 and these perforations are so arranged as to be disposed below the end of the pipe 1 or above the same so as to either convey the water to a point exteriorly of the tank 2 or allow the same to gravitate down upon the filtering material depending entirely upon the rotary motion being given to the tube by means of a person applying pressure to the exteriorly arranged end of the tube.

From the foregoing description it will be readily seen that when the openings or perforations are disposed below the end of the pipe 1 water will pass through these openings down upon the filtering material where the same will percolate to the outlet 4. Should it become necessary to stop the flow of liquid through the filtering material the tube 6 is given one-half of a revolution with the result that the perforations are arranged above the end of the pipe 1 so that the liquid passing from the latter will flow through the tube 6 to the outlet end thereof from whence the liquid will pass to a remote point.

From the foregoing description taken in connection with the accompanying drawing it will be apparent that I provide a device which is admirably adapted for the purpose for which it is intended, that the device is simple, durable and efficient of construction, and that the device may be manufactured and sold at a comparatively low cost; and changes in the form, proportion and minor details of construction may be made within the scope of the claims without departing from the spirit or sacrificing any advantages of the invention.

A feature of this device is that the rotatable tube or cylinder is easily inserted in the compartment 2 and can be quickly and easily removed for the purpose of cleaning and is entirely free and open at the outer end so that liquid can flow through same to a point at some distance from the filter and by reason of the single compartment 2 without passages or obstructions there is no danger of any freezing of the liquid.

Having described my invention what I claim is—

1. In a combined conveyer and filter, a tank having an outlet at the bottom thereof and filtering material above said outlet, an inlet pipe extending into one wall of the tank near the upper portion thereof, and a transversely extending open-ended tube rotatably mounted in said tank and communicating with said pipe, said tube being extended through the opposite wall of said tank and being provided with perforations on one side thereof.

2. A combination conveyer and filter comprising a tank provided with an outlet at the bottom thereof, a pipe projecting through one wall of the tank near the top thereof, a tube rotatably mounted upon the projecting end of said pipe, and extending through the opposite wall of said tank and adapted to be removed readily from the pipe and tank, said tube being open at the projecting end and having perforations in a longitudinal portion thereof.

In testimony whereof I affix my signature in presence of two witnesses.

WILLIAM F. SMITH.

Witnesses:
EDWARD H. SCHUER,
GERTRUDE M. DONOHUE.

Copies of this patent may be obtained for five cents each, by addressing the "Commissioner of Patents, Washington, D. C."